Patented Dec. 18, 1951 2,578,892

UNITED STATES PATENT OFFICE 2,578,892

SOUND RECORDING DISK

William Edward Lord, Harlington, England, assignor to Electric and Musical Industries Limited, Hayes, England, a company of Great Britain No Drawing. Application January 7, 1947, Serial No. 720,681. In Great Britain April 7, 1944

Section 1, Public Law 690, August 8, 1946
Patent expires April 7, 1964

6 Claims. (Cl. 117—74)

This invention relates to sound recording discs comprising a base having provided thereon a recording surface in which a sound track can be formed for retaining a record of sound vibrations.

Heretofore, the base for such discs has usually comprised aluminium, glass or zinc. Aluminium affords a very satisfactory base but such material is now difficult to obtain and whilst glass also forms a satisfactory base, it is expensive and fragile and together with an aluminium base requires to be highly polished before application of the recording surface, whilst zinc is heavy and difficult to obtain with a smooth surface. The usual recording surface comprises a film of nitro-cellulose composition suitably plasticised and applied to the base by dipping the base in, or spraying it with, a suitable solution of nitro-cellulose. Whilst the base should have a highly polished surface, it is found that the adhesion of the film to glass, aluminium and zinc is relatively poor and the surfaces to which the film is applied frequently have to be abraded, sand-papered or sand-blasted in order to provide for the proper adhesion of the film. This operation unless effected with extreme care tends to impair the ultimately formed recording surface.

It is evident that the base to which the film is applied should resist attack by the solvent employed for the film composition whilst at the same time the base should be able to retain the dried film firmly in position and secured to the surface of the base. There are many synthetic materials at present available which might be thought to be suitable for use as a base for recording discs but many of these suffer from the disadvantage that they are attacked too rapidly by the solvents used for the recording film, so rendering them unsuitable. If the surface of the synthetic base composition is attacked too rapidly by the solvents in the cellulose solution, the two layers tend to merge and the recording quality of the film is impaired.

It is, therefore, the object of the present invention to provide a recording disc having an improved base with a view to overcoming or avoiding the above-mentioned difficulties.

According to the invention, a recording disc is provided, comprising a base having a surface composed of solid polymerized methyl methacrylate and a recording film applied to said surface. The base may be composed wholly of polymerized methyl methacrylate or, alternatively, where a more rigid base is required, a surface of polymerized methyl methacrylate may be applied to a base of glass or metal and the recording film applied to such surface. The preferred recording film is one composed of nitro-cellulose and it is found that solid polymerized methyl methacrylate resists sufficiently attack by the usual solvents employed for nitro-cellulose, thus rendering it eminently suitable as a surface for the reception of a recording film, whilst at the same time the recording film is found to adhere adequately to the base. The rate of attack by solvent although slow is sufficient to provide a thorough welding of the film to the surface.

The recording film is found to be exceedingly difficult to remove from the base and if, as is sometimes the case, it is desirable to be able to strip the recording film from the base so as to utilize the base for the manufacture of further recording discs, a thin film of albumen containing a chromate hardener may be applied to the surface of polymerized methyl methacrylate before applying the recording film. With such a construction, it is possible to remove the recording film by swelling the latter in a weak solvent mixture without adversely affecting the base.

In manufacturing recording discs according to one form of the invention, the base of the recording disc is stamped out to a suitable size from a highly polished sheet of solid polymerized methyl methacrylate. Such material is known by the registered trade-mark "Perspex." The thickness of the disc for high quality single-sided discs may be about ¼" whilst for double-sided recording discs a thickness of about 0.080" is suitable. A disc of the material ¼" thick does not warp when coated on one side only with the recording film but where the thinner discs are employed, both sides must be coated in order to equalize the tension resulting from film shrinkage on both sides. In an alternative form of the invention, the base is formed by moulding discs to the required size and thickness from a suitable methyl methacrylate moulding powder, such as that known by the registered trade-mark "Diakon," and in the usual form of record press provided with plain highly polished matrices. According to a further method of manufacturing the base, powdered acrylic polymer can be worked into a dough by means of monomeric liquid methyl methacrylate. The dough so formed can be moulded at low pressure between polished platens and the mass caused to polymerize or harden by the application of heat during the pressure period. If an extremely rigid base is required, the base may be composed of a disc of glass or metal provided with a layer of polymerized methyl methacrylate. In this construction, the disc of glass or metal is provided with a thin coating of liquid acrylic monomer in such a way that the coating is applied to the edge and both sides of the glass or metal base. By suitable treatment, e. g., in an autoclave, the liquid monomer is subjected to heat and pressure causing the liquid to solidify and harden. In this construction and in the case where the base is formed from a powder or dough, a catalyst for example, benzoyl peroxide must be present. Such catalyst being usually added to the liquid monomer prior to mixing to form the dough or prior to applying the liquid monomer to the disc of glass or metal. Where the material "Diakon" is used, the catalyst is already present in the powder although additional catalyst may be added to accelerate the process.

After formation of the base, the recording film can be applied thereto in any suitable manner as by flow coating the one side of the relatively thick disc or by dipping both sides of the relatively thin discs in a solution of the recording film. Any other convenient method of coating may be employed, e. g., spraying. The preferred recording film is one composed of a nitro-cellulose composition such as collodion cotton plasticized with a substantial quantity of a suitable plasticizing agent such as dibutyl phthalate, tricresyl phosphate or castor oil. The nitro-cellulose and plasticizers are dissolved in a suitable solvent such as a mixture of acetone, butyl acetate, ethylene-glycol-monoethyl ether and methyl-cyclohexanone.

As stated above, if it is desired to provide a recording disc in which the recording film can be removed, a thin film of albumen containing a chromate hardener can be applied to the surface of polymerized methyl methacrylate before applying the recording film. Such thin film of albumen may be of the order of 0.001'' or less in thickness and may be applied by rotating the disc at a fairly high speed in a horizontal plane and pouring over the surface of the disc a solution of albumen and potassium dichromate. When it is desired to remove the recording film, the latter can be immersed in the solvent mixture above referred to so that the film swells, allowing it to be easily stripped from the base.

I claim as my invention:

1. A sound recording disc comprising a base having a surface composed of solid polymerized methyl methacrylate and a recording film comprising a coating of plasticized nitro-cellulose applied to said surface, said film having a sound track thereon.

2. A sound recording disc comprising a base wholly composed of solid polymerized methyl methacrylate having on at least one surface thereof a recording film comprising a coating of plasticized nitro-cellulose, said film having a sound track thereon.

3. A sound recording disc comprising a base composed of a glass disc provided with a surface coating of solid polymerized methyl methacrylate having thereon a recording film comprising a coating of plasticized nitro-cellulose, said film having a sound track thereon.

4. A sound recording disc comprising a base composed of a metal disc provided with a surface coating of solid polymerized methyl methacrylate having thereon a recording film comprising a coating of plasticized nitro-cellulose, said film having a sound track thereon.

5. A sound recording disc comprising a base having a surface of solid polymerized methyl methacrylate, a recording film comprising a coating of plasticized nitro-cellulose applied to said surface, and a thin film of albumen containing a chromate hardener interposed between said methacrylate surface and said nitro-cellulose film, said recording film having a sound track thereon.

6. A sound recording disc comprising a base wholly composed of solid polymerized methyl methacrylate, a recording film comprising a coating of plasticized nitro-cellulose applied to at least one surface thereof, and a thin film of albumen containing a chromate hardener interposed between said surface and said nitro-cellulose film, said recording film having a sound track thereon.

WILLIAM EDWARD LORD.

REFERENCES CITED

The following references are of record in the file of this patent:

UNITED STATES PATENTS

| Number | Name | Date |
|---|---|---|
| 666,819 | Reynard | Jan. 29, 1901 |
| 1,997,572 | Bren | Apr. 16, 1935 |
| 2,011,246 | Hyden | Aug. 13, 1935 |
| 2,272,157 | Spinner | Feb. 3, 1942 |

FOREIGN PATENTS

| Number | Country | Date |
|---|---|---|
| 299,752 | Great Britain | Oct. 29, 1928 |
| 102,375 | Austria | 1937 |
| 484,434 | Great Britain | May 5, 1938 |
| 489,725 | Great Britain | Aug. 3, 1938 |
| 838,361 | France | Mar. 3, 1939 |
| 552,222 | Great Britain | Mar. 29, 1943 |